United States Patent [19]

Tur et al.

[11] Patent Number: 4,768,880
[45] Date of Patent: Sep. 6, 1988

[54] SYSTEM AND METHOD FOR ACCURATE LOOP LENGTH DETERMINATION IN FIBER-OPTIC SENSORS AND SIGNAL PROCESSORS

[75] Inventors: Moshe Tur, Tel Aviv, Israel; Byoung Y. Kim, Menlo Park, Calif.; Janet L. Brooks; Herbert J. Shaw, both of Stanford, Calif.

[73] Assignee: The Board of Trustees of the Leland Stanford Junior University, Stanford, Calif.

[21] Appl. No.: 877,321

[22] Filed: Jun. 23, 1986

[51] Int. Cl.$^4$ .................................................. G01B 9/02
[52] U.S. Cl. .................................... 356/345; 250/227; 356/358
[58] Field of Search ................... 356/5, 345, 358, 383; 250/227

[56] References Cited

U.S. PATENT DOCUMENTS

| | | | |
|---|---|---|---|
| 3,511,568 | 5/1970 | Hossmann | 356/5 |
| 4,299,490 | 11/1981 | Cahill et al. | |
| 4,334,781 | 6/1982 | Ozeki | |
| 4,372,685 | 2/1983 | Ulrich | |
| 4,375,680 | 3/1983 | Cahill et al. | |
| 4,432,599 | 2/1984 | McMahon | |
| 4,443,700 | 4/1984 | Macedo et al. | |
| 4,572,949 | 2/1986 | Bowers et al. | |
| 4,697,926 | 10/1987 | Youngquist et al. | |
| 4,699,513 | 10/1987 | Brooks et al. | |

FOREIGN PATENT DOCUMENTS 3044183 6/1982 Fed. Rep. of Germany .
2106736 4/1983 United Kingdom .

OTHER PUBLICATIONS

Sheem et al., "Wavelength Monitoring of Single-Mode Diode Laser Using Guided-Wave Interferometer", *Optics Letters*, vol. 5, No. 5, pp. 179-181, 5/80.
John P. Palmer, et al., "Analog Matrix Multiplication by Directional Coupling Between Optical Fibers," *SPIE*, vol. 232, International Optical Computing Conference, 1980, pp. 157-159.
R. Ulrich, "Fiber-Optic Rotation Sensing with Low Drift," *Optics Letters*, vol. 5, No. 5, May 1980, pp. 173-175.
A. R. Nelson, et al., "Passive Multiplexing Techniques for Fiber-Optic Sensor Systems," I.F.O.C., Mar. 1981, p. 27.

(List continued on next page.)

Primary Examiner—Davis L. Willis
Assistant Examiner—Matthew W. Koren
Attorney, Agent, or Firm—Knobbe, Martens, Olson & Bear

[57] ABSTRACT

A technique and system for accurate determination of differential propagation delays in fiber-optic circuits. The method includes providing a sinusoidally modulated optical signal to each of two waveguides defining optical paths. The optical signals received from the optical paths are combined to form a reference output signal which has a null waveform whenever the propagation delay between the optical signals contains an odd number of half periods of the optical signal waveforms. The difference in the sinusoidal modulation frequency producing a first and second null or constant waveform in the reference signal is determined. This difference value between adjacent frequencies forming the null or constant waveforms comprises the inverse of the difference of signal propagation delay in the two optical paths. Accuracy is improved by measuring the sinusoidal modulation frequencies corresponding to first and second waveforms which are not formed by adjacent frequencies. The difference between those nonadjacent frequencies is divided by the difference in the reference waveform orders of the null reference waveforms to obtain the inverse of the differential propagation delay. Further accuracy is achieved by measuring at least one of the waveform nulls at a high waveform order. Still further accuracy is achieved by monitoring the reference waveforms on a network analyzer and using a frequency synthesizer to more precisely match and identify the modulation frequencies corresponding to the null reference signal waveforms. A system is disclosed for implementing this technique optionally using optical sources having a short coherence length. Mathematical relationships are disclosed for use with measured values in obtaining further improved accuracy.

31 Claims, 2 Drawing Sheets

OTHER PUBLICATIONS

R. A. Bergh, et al., "All-Single-Mode Fiber-Optic Gyroscope," *Optics Letters*, vol. 6, No. 4, Apr. 1981, pp. 198-200.

R. A. Bergh, et al., "All-Single-Mode Fiber-Optic Gyroscope with Long-Term Stability," *Optics Letters*, vol. 6, No. 10, Oct. 1981, pp. 502-504.

H. C. Lefevre, et al., "All-Fiber Gyroscope With Inertial-Navigation Short-Term Sensitivity," *Optics Letters*, vol. 7, No. 9, Sep. 1982, pp. 454-456.

J. E. Bowers, et al., "Fiber-Optic Variable Delay Lines," *Electronics Letters*, vol. 18, No. 23, Nov. 11, 1982, pp. 999-1000.

D. Uttam, et al., "Remote Interferometric Sensors Using Frequency Modulated Laser Sources," *First International Conference on Optical Fiber Sensors*, London, Apr. 26-28, 1983, pp. 182-184.

M. L. Henning, et al., "Optic Fiber Hydrophones with Down Lead Insensitivity," *Proceedings of the First International Conference on Optical Fiber Sensors*, London, 1983, pp. 23-27.

I. P. Giles, et al., "Coherent Optical-Fiber Sensors with Modulated Laser Sources," *Electronics Letters*, vol. 19, No. 1, Jan. 6, 1983, pp. 14-15.

S. A. Al-Chalabi, et al., "Partially Coherent Sources in Interferometric Sensors," *IEEE, Proceedings of the First International Conference on Optical Fiber Sensors*, Apr. 1983, pp. 132-135.

B. Y. Kim, et al., "Response of Fiber Gyros to Signals Introduced at the Second Harmonic of the Bias Modulation Frequency," *SPIE*, Conference Proceedings Held in San Diego, Calif., vol. 425, Aug. 1983, pp. 86-89.

R. C. Youngquist, et al., "Birefringent-Fiber Polarization Coupler," *Optics Letters*, vol. 8, No. 12, Dec. 1983, pp. 656-658.

P. Jaccard, et al., "A New Technique for Low Cost All-Fiber Device Fabrication," *SPIE's Technical Symposium East*, 1984.

J. P. Goedgebuer, et al., "Multiplex Communication Via Electro-Optic Phase Modulation of White Light," *Taylor Francis Ltd*, vol. 29, No. 4, 1984, pp. 471-477.

B. Y. Kim, et al., "All-Fiber-Optic Gyroscope with Linear Scale Factor Using Phase Detection," *SPIE*, vol. 478, Fiber Optic and Laser Sensors II, 1984, pp. 142-148.

B. Y. Kim, et al., "Phase-Reading All-Fiber-Optic Gyroscope," *Optics Letters*, vol. 9, No. 8, Aug. 1984, pp. 378-380.

Th. Bosselmann, et al., "High Accuracy Positioning Sensing with Fiber-Coupled White-Light Interferometers," *Second International Conference on Optical Fiber Sensors*, Stuttgart, Sep. 5-7, 1984, pp. 361-364.

A. J. Rogers, "Polarization-Optical Time Domain Reflectometry: A Technique for the Measurement of Field Distributions," *Applied Optics*, vol. 20, No. 6, Mar. 15, 1981, pp. 1060-1074.

J. E. Bowers, "Fiber-Optical Sensor for Surface Acoustic Waves," *Applied Physics Letters*, vol. 41, No. 3, Aug. 1, 1982, pp. 231-233.

J. P. Dakin, et al., "Novel Optical Fiber Hydrophone Array Using a Single Laser Source and Detector," *Electronics Letters*, vol. 20, No. 1, Jan. 5, 1984, pp. 53-54.

S. W. Thornton, "Experimental Performance of an Optical Hydrophone with Downlead Sensitivity," *Second International OFS Conference*, Stuttgart, Sep. 5-7, 1984, pp. 369-373.

J. P. Dakin, et al., "Optical Fiber Hydrophone Array-Recent Progress," *Second International OFS Conference*, Stuttgart, Sep. 5-7, 1984, pp. 375-379.

E. L. Green, et al., "Remote Passive Phase Sensor," *OFS*, 1985, pp. 1-4.

Stuart A. Kingsley, et al., "OFDR Diagnostics for Fiber/Integrated Optic Systems and High Resolution Distributed Fiber Optic Sensing," SPIE, vol. 566, Fiber Optic and Laser Sensors III, pp. 265-275, 1985.

J. L. Brooks, et al., "Fiber-Optic Interferometric Sensor Arrays with Freedom from Source Phase-Induced Noise," *Optics Letters*, vol. 11, No. 7, Jul. 1986, pp. 473-475.

SYSTEM AND METHOD FOR ACCURATE LOOP LENGTH DETERMINATION IN FIBER-OPTIC SENSORS AND SIGNAL PROCESSORS

BACKGROUND OF THE INVENTION

1. Field of the Invention

The present invention relates to measurement of loop length in fiber-optic circuits such as sensors and signal processors, and more particularly to a method for the accurate determination of differential propagation delays in such fiber-optic circuits.

2. The Prior Art

Fiber-optic coils are commonly used today as delay lines in various applications. For example, fiber-optic delay lines are utilized in interferometric fiber-optic sensors, fiber-optic signal processors, and fiber-optic lattice filters. The delay lines may be used in combination in interferometers to produce large differences in signal propagation delays, or they may be used in recirculating delay lines to give a large value to the round trip delay.

There is often a need for an accurate determination of the relative propagation delays in optical circuits such as those mentioned above. For example, matching of the path imbalances in pairs of interferometers used in sensor arrays is important to insure that phase-induced intensity noise does not arise to a measurable level on the signal pulse propagating within the interferometers. Without matching of the paths, the uncompensated imbalances in the various loop lengths require the use of long coherence lengths in signal sources, and/or the uncompensated imbalances introduced phase-induced intensity noise into the signals propagating within the sensor arrays.

The performance of fiber-optic lattice filters depends on the tolerances of the filter delay line lengths. These tolerances may reach 1 millimeter in 100 meters or, in other words, 10 parts per million (PPM).

Various techniques have been applied in the past in efforts to measure propagation delays in fiber-optic circuits and, in particular, to measure the differential propagation delays in pairs of optical circuits used in applications such as those described above. These techniques have been subject to limitations which have made it difficult to achieve the tolerances necessary for optimum design.

For example, one technique which has been used for somewhat different applications is referred to as optical time domain reflectometry. This technique has often found application in monitoring the integrity of optical fiber communications systems and other long line optical systems. The technique comprises launching a narrow pulse of light into an optical fiber, wherein it is continuously Rayleigh scattered as it propagates along the fiber. Some of the scattered light will be returned to the launch point. The intensity information present in this back scattered light is used to determine the distribution of attenuation along the optical fiber. This attenuation information is particularly useful for locating bad joints and anomalously lossy sections of fiber. It has been proposed to also use polarization information contained in the back scattered light, to determine the distribution, along the length of the fiber, of external influences which effect the polarization state of the light propagating in the fiber.

Such a system is useful in locating breaks, bad joints and the like or in detecting environmental conditions in long optical fiber systems such as communication systems which have a break somewhere along a 1 kilometer length of line. This system can be used to approximately identify the location of concern, within a tolerance which is probably on the order of 10 centimeters. Although such a technique finds application as described above, it cannot provide measurements which even approach the tolerances necessary to find useful application in the determination of propagation delay in sensing, signal processing and filtering circuits.

Another technique which has been utilized for determination of differential signal propagation time in optical fiber sensors and similar circuits is a technique referred to as optical frequency domain reflectometry. In this technique, an optical input signal is frequency modulated by use of a ramp frequency in time. The frequency modulated signal is communicated into a pair of optical waveguides having different optical path lengths. The signals propagated from the pair of waveguides are mixed and the mixed signal is monitored to determine the difference in frequency at each moment. This difference provides a measure of the difference in optical path length of the pair of waveguides.

This optical frequency domain reflectometry technique is able to meet many of the required tolerances of optical circuits such as sensors and signal processors. However, because frequency modulation is utilized, the technique requires that the path length difference which is being measured be shorter than the coherence length of the laser. As a result, such a system can only measure moderate differences in arm lengths. The maximum difference is, of course, dependent upon the coherence length of the source. Based upon optical sources which are commonly available in the commercial marketplace, such a difference is typically not more than a range of about 2-10 meters, depending upon the optical source. In addition, this technique is limited with respect to the minimum difference which can be detected to an amount on the order of about 15 centimeters. Thus, because of the complexity of the equipment required for accomplishing such techniques, as well as the limited ranges in which the technique can be applied, there are many applications which cannot be serviced by such techniques.

For example, one technique which may be used for measuring the differential propagation delays comprises an impulse response measurement of the system. Such a measurement consists of putting a short optical pulse into the system and detecting the resulting pulses at the output of the fiber-optic system. A measurement may be made of the time delay between adjacent pulses to provide a measurement of the optical path length difference between adjacent arms in the fiber-optic system. This method suffers from several disadvantages, including a limitation on the accuracy with which such measurements may be made, depending upon the width of the input pulse from the source. In addition, the cost of equipment associated with this type of method rises rapidly with the requirement for improved resolution. This results from the fact that both lasers and detectors necessary for detecting short pulses become increasingly expensive as the width of the pulse which is to be produced or detected in decreased.

In view of the above, it would be a great improvement in the technology to provide a reliable and easily implemented technique to accurately measure the difference in propagation delays in fiber-optic circuits. It would be a further improvement in the technology to provide such a technique and system which could provide differential propagation length measurements at very small tolerance values and throughout a very broad range of optical path length differences. It would be a still further improvement in the technology if such a technique were provided which made use of the properties and characteristics of the circuits themselves when making the measurements.

BRIEF SUMMARY OF THE INVENTION

The present invention comprises a novel method and system for accurately determining differential propagation delays in fiber-optic circuits such as those commonly found in sensing and signal processing arrays. The method utilizes the high order frequency filtering characteristics of these circuits in accomplishing its function.

The method comprises transmitting a modulated optical signal at a selected range of frequencies into each of two optical waveguides. The optical signals output from the waveguides are summed to produce a reference signal which is monitored by equipment such as a spectrum analyzer to identify signal nulls in the reference signal waveform created at modulation frequencies where an odd number of half periods of the sinusoidally modulated signal fit into the propagation delay period between the signals propagating in the two circuits. A signal null is defined herein to be the condition wherein the reference signal does not reflect the input modulation frequency.

The frequency of the sinusoidally modulated signals transmitted into the two signal paths is varied over a large range of frequencies, encompassing many nulls in the reference signal. The modulation frequency corresponding to one particular null is noted, and then the modulation frequency of a second substantially null waveform is noted in the reference signal.

A value representative of the difference in the signal propagation time between the first and second signal paths is identified by determining the difference between the frequency which produced one substantially null waveform in the reference signal, and the frequency which produced another substantially null value in the reference signal, along with a determination of the number of nulls between the two measured frequencies.

More accuracy can be obtained in identifying the true modulation signal frequencies which produce the null waveforms by examining corresponding notch signals which are displayed on a network analyzer or a spectrum analyzer when a null is detected. A frequency synthesizer is used to generate another signal which is compared in the spectrum analyzer with the notch signal. By adjusting the frequency synthesizer, its associated signal can be made to essentially match the frequency of the notch signal to a very small tolerance. When a notch and a synthesizer signal are overlapped on the spectrum analyzer display, the frequency of the notch signal is determined by reading the corresponding frequency being produced by the frequency synthesizer.

Having monitored the system to obtain information representative of the differential propagation delay, a more exact value for this delay can be determined through use of mathematical relationships.

Once the differential propagation delay of a pair of optical paths is determined, one may change that delay to achieve a desired delay period by using any technique which can remove small lengths of fiber from one or the other of the waveguides which define the optical path lengths. By this means, the propagation delay may be either increased or decreased.

Because of the simplicity and ease of application of the method for determining the differential delay, one may repeatedly determine the delay and then adjust the lengths of the waveguides for as many iterations as needed to achieve, within a very small tolerance, the desired goal.

The technique of the present invention provides a means for both detecting differential propagation delay values and matching those values to a desired level in a manner which is very accurate, and easy to perform. The technique permits matching of delay periods to tolerances such that sensitive interferometric systems can utilize optical sources having a short coherence length, thereby including a wide range of commercially available lasers which are less expensive and more compact than those having longer coherence lengths. In addition, it is necessary for the proper functioning of fiber-optic signal processing systems that the length of fiber-optic delay lines in such systems be accurately determined. Further, the technique accomplishes its purpose by utilizing the high order frequency filtering characteristics of the circuits themselves, and thereby minimizing the requirements for external, technically complicated equipment.

DETAILED DESCRIPTION OF THE PREFERRED EMBODIMENT

The invention is best understood by reference to the figures wherein like parts are designated with like numerals throughout.

Figure 1:
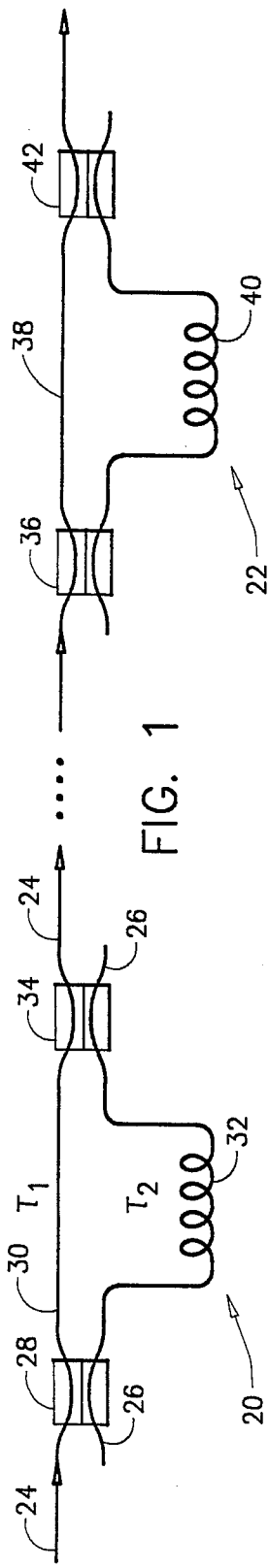
FIG. 1 is a schematic drawing illustrating a feed-forward embodiment of an interferometric fiber-optic sensor circuit.

One basic circuit which is used in optical fiber sensors and signal processors comprises the feed-forward circuit illustrated in FIG. 1. This particular circuit comprises a number of series-connected Mach-Zehnder interferometers. This circuit may be used in a number of applications, including signal processor systems or sensor arrays.

Preferred embodiments of interferometric fiber-optic remote sensor system such as the one illustrated in FIG. 1 are described in detail in U.S. patent application Ser. No. 738,678 filed May 28, 1985 and entitled "Distributed Sensor and Method Using Coherence Multiplexing of Fiber-Optic Interferometric Sensors," and in U.S. patent application Ser. No. Unknown (Attorney Docket No. STANF.71A) filed June 23, 1986 to Kim et al. entitled "Distributed Sensor Array and Method Using a Pulsed Signal Source," which application is filed concurrently herewith, and also in Brooks et al. "Coherence Multiplexing of Fiber Optic Interferometric Sensors," Vol. LT-3, *Journal of Lightwave Technology*, No. 5, pages 1062–1071, (October 1985), the patent application being assigned to the assignee of the present invention. These documents are hereby incorporated by reference.

An exemplary application which utilizes the fiber-optic circuit configuration of FIG. 1 is a passive remote interferometric sensor, comprising at least a first sensing interferometer generally indicated at 20 and a compensating or receiving interferometer generally indicated at 22.

More particularly, the sensor configuration of FIG. 1 includes a first optical fiber 24 and a second optical fiber 26 which are placed in optically coupling relationship in a first fiber-optic directional coupler 28 to carry an optical signal input to the interferometer 20. The directional coupler 28 is of the same type as other directional couplers utilized in the optical fiber systems described herein. One preferred embodiment of a directional coupler which may be used in the system is described in detail in U.S. Pat. No. 4,493,528 entitled "Fiber-Optic Directional Coupler" and U.S. Pat. No. 4,536,058 entitled "Fiber-Optic Directional Coupler," both of said patents assigned to the assignee of the present invention. These patents are hereby incorporated by reference.

After passing through coupler 28, optical fibers 24 and 26 define, respectively, a first arm 30 and a second arm 32 of interferometer 20. At least a portion of one of the arms 30, 32 is constructed for exposure to environmental effects, such that they are sensitive to and respond to those effects by influencing the phase of optical signals traveling in the arm.

Optical fibers 24 and 26 are again placed in optically coupling relationship in a second fiber-optic directional coupler 34, forming an output port of interferometer 20.

The compensating interferometer 22 is constructed in a substantially identical configuration to the interferometer 20. Specifically interferometer 22 again brings fiber 24 into coupling relationship in a third fiber-optic coupler 36, after which the fibers form, respectively, a third arm 38 and a fourth arm 40. In this case, the arms 38, 40 are shielded by a suitable shielding, so that neither of the arms 38 or 40 are sensitive to environmental effects. The fibers are again placed in optically coupling relationship in a fourth fiber-optic directional coupler 42, forming the output of the receiving interferometer 22.

Arm 32 of interferometer 20 is illustrated in a coiled configuration, defining an optical path length which is longer than the optical path length defined by arm 30 of that interferometer. The length of the optical paths is directly related to the time period for an optical signal to propagate through the path, referred to as the signal propagation delay. The signal propagation delay on arm 30 is represented by the term $\tau_1$. Similarly, the signal propagation delay of arm 32 is identified as $\tau_2$. Accordingly, the difference in the path lengths correspond to a difference in the propagation delays $\tau_1$ and $\tau_2$, which is also referred to as the differential propagation delay, and is designated as $\tau$.

The optical path lengths of the arms 30 and 32 are constructed to be sufficiently different so that the optical signals input through coupler 28 will be output through optical coupler 34 at times which are sufficiently different so that the signals do not coherently couple. As a result, the signal which passes through arm 30 is maintained substantially intact and separate from the signal which passes through arm 32, when the signals are coupled at the coupler 34.

The signals transmitted from interferometer 20 are received in interferometer 22, with a portion of each signal being transmitted through each of the arms 38 and 40. Again, arm 40 is constructed to define an optical path length which is longer than arm 38. In fact, the path length difference between arms 38 and 40 is matched as closely as possible to the optical path length difference between arms 30 and 32 of interferometer 20. As a result, the portion of the optical signal which traveled through arm 32 in interferometer 20, and which is coupled through arm 38 of interferometer 22 will have traveled substantially the same optical path length as the signal which passed through arm 30 of interferometer 20 and through arm 40 of interferometer 22. Accordingly, these optical signals will coherently couple in the coupler 42, providing a phase difference output signal which is representative of the environmental effects which influenced the optical signal propagating through that arm of interferometer 20 which was sensitive to environmental effects.

The ability to closely match the differential phase delay of the interferometer 20 with the interferometer 22 essentially overcomes the above problem. Such a method is described herein, with reference to its application in an optical interferometer of the type generally indicated at 20 and 22.

Figure 2:
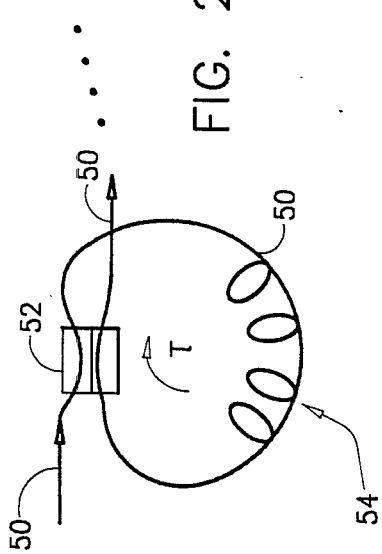
FIG. 2 is a schematic drawing illustrating a portion of a fiber-optic signal processor system, comprising a recirculating or feed-backward loop circuit.

By reference to FIG. 2, another fiber-optic circuit which is commonly used in fiber-optic applications and which requires accurate differential propagation delay matching may be described. Specifically, the circuit of FIG. 2 comprises a feed-backward or backward-flow recirculating loop which finds application in systems such as fiber-optic signal processors. The circuit may be utilized, for example, in combining successive optical pulses traveling along an optical fiber in accomplishing addition of the pulses, or in performing steps in mathematical processes such as matrix multiplication. This circuit also finds application in fiber-optic lattice filters.

The device of FIG. 2 comprises an optical waveguide such as an optical fiber 50 which extends through a fiber-optic directional coupler 52. After passing through coupler 52, an extended length of the optical fiber 50 is configured to define a delay line which again passes, at its other end, through coupler 52 so as to be in optical coupling relationship with the location on fiber 50 which first passed through the coupler 52. This creates a recirculating delay line having a round trip signal propagation delay $\tau$ which depends upon the length of the recirculating loop, generally indicated at 54.

After passing through coupler 52 for the second time, optical fiber 50 passes to another fiber-optic directional coupler 56 and forms another recirculating loop 58 configured in the manner described with respect to recirculating loop 54.

The round trip delay $\tau$ of the recirculating loops 54 and 58 is selected so that the optical signals which are to be processed will pass through the respective couplers 52 and 56 at those times which will place the incoming signals and the recirculating signals in appropriate relationship with respect to each other on the fiber 50. For optimum performance of the configuration of FIG. 2 when used in applications such as fiber-optic lattice filters, the preferred tolerances of the optical signal path lengths may reach 1 millimeter in 100 meters, or 10 parts per million. The method of the present application permits these tolerances to be reached in determining the differential propagation delay $\tau$ detected in the optical fibers at the output of couplers 52 and 56.

Preferred embodiments of fiber-optic signal processor systems and fiber-otpic lattice filters utilizing optical circuits such as that disclosed in FIG. 2 are described in detail in U.S. patent application Ser. No. 503,871 filed June 13, 1983 and entitled "Optical Guided Wave Signal Processor For Matrix-Vector Multiplication and Filtering," and in U.S. patent application Ser. No. 622,637 filed June 20, 1984 and entitled "Cascaded Fiber Optic Lattice Filter," and also in Moslehi et al. "Fiber Optic Lattic Signal Processing," *Proceedings of the IEEE*, Vol. 72, No. 7, page 909 et seg., (July 1984), the patent application being assigned to the assignee of the present invention. These documents are hereby incorporated by reference.

Figure 3:
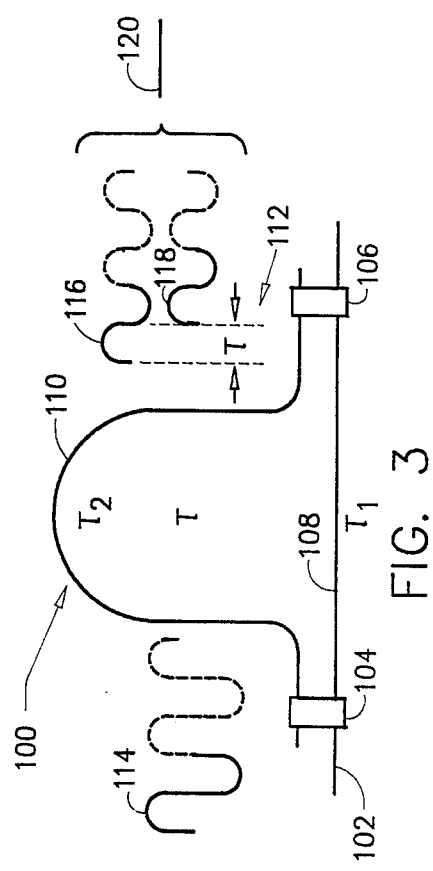
FIG. 3 is a schematic drawing of a Mach-Zehnder interferometer, illustrating a sinusoidally modulated optical input signal and the corresponding optical output signal at a first modulation frequency.
Figure 4:
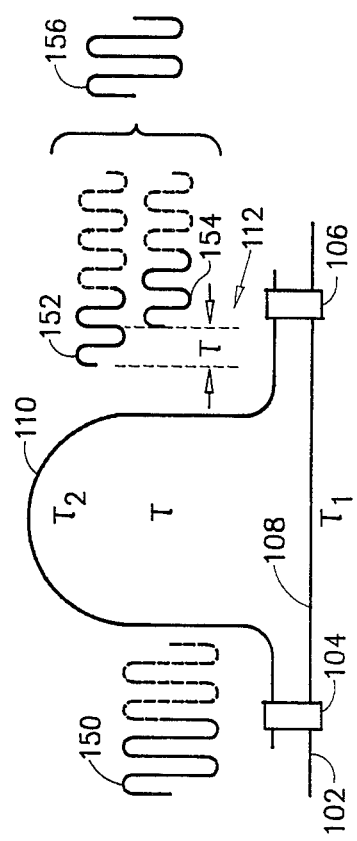
FIG. 4 is a schematic drawing of a Mach-Zehnder interferometer, illustrating a sinusoidally modulated optical input signal and the corresponding optical output signal at a second modulation frequency.

The technique of the present invention can be described in general terms by reference to FIGS. 3 and 4. Referring initially to FIG. 3, an optical fiber interferometer such as that illustrated at 20 or 22 in FIG. 1 is illustrated. Specifically, FIG. 3 illustrates an interferometer generally indicated at 100 which includes a first optical fiber 102 having an input fiber-optic directional coupler 104 and an output fiber-optic directional coupler 106 positioned thereon to form a first arm 108 extending between the couplers 104 and 106. A second arm 110 is formed by an optical fiber segment which is secured at each of its ends in optical coupling relationship with optical fiber 102 by means of directional couplers 104 and 106.

Arm 108 of the interferometer 100 defines an optical path having an optical signal propagation delay between couplers 104 and 106 identified as $\tau_1$. Also, arm 110 defines an optical path having an optical signal propagation delay between couplers 104 and 106 identified as $\tau_2$. Accordingly, the differential propagation delay for an optical signal entering interferometer 100 via coupler 104 is identified at coupler 106 as the value $\tau$, which corresponds to the relationship $\tau = \tau_1 - \tau_2$. This differential propagation delay period $\tau$ is generally indicated at 112 in FIG. 3.

If the light that is sent into the interferometer 100 of FIG. 3 comes from an optical source that has a coherence length that is much shorter than the differential propagation delay $\tau = \tau_1 - \tau_2$, then the light will not interfere at the second coupler 106, but rather it will add algebraically. Further, if the optical signal input to the interferometer 100 is sinusoidally modulated at a particular frequency such as a radio frequency (RF), the amount of the modulation detected at the output of coupler 106 will depend on the differential propagation delay $\tau$. Accordingly, the device used in this manner comprises an RF interferometer.

The amount of modulation seen at the output of coupler 106 also depends on the particular input modulation frequency selected. For example, an optical signal which is sinusoidally modulated at a first selected frequency such as illustrated at 114 will produce a sinusoidally varying optical signal 116 traveling in arm 108 which experiences a propagation delay period of $\tau_1$. The signal 114 will also produce another sinusoidally varying signal 118 traveling in arm 110 which experiences a propagation delay of $\tau_2$. At the output of coupler 106, the waveforms 116 and 118 have a relationship to each other which is based upon their relative arrival times at the coupler 106, with this relative arrival time corresponding to the differential delay period indicated at 112.

In the situation illustrated in FIG. 3, the frequency of the signal 114 is such that the differential propagation delay period $\tau$ corresponds to $\frac{1}{2}$ the period of the sinusoidal modulation. Accordingly, the signals which are combined in 106 are summed together to produce an output having a waveform which is a constant or null 120 in the sinusoidal modulation at the modulation frequency 14.

A null is defined herein to be the condition wherein the reference signal does not reflect the input modulation frequency. For example, if the unmodulated input signal has a constant, level amplitude (e.g., flat), then the signal output from coupler 106 of FIG. 3 will also have a constant, level amplitude. This occurs because the signals combined in coupler 106 from the arms 108 and 110 will both have constant, level amplitudes. However, when a periodic modulation signal such as the sinusoidal signal 114 is applied to this input signal, the waveforms 116 and 118 input to arms 108 and 100 have a periodic frequency corresponding to the signal 114. Accordingly, the output signal from coupler 106 will directly reflect the sum of these modulation signals.

Certain frequencies of the modulation signal on the input 114 will produce output signals 116 and 118 whose modulation signal components are 180° out of phase with each other. In this condition, there are an odd number of half periods of the waveforms 116, 118 in the differential delay $\tau$. These modulation components in the output signals cancel each other in this situation, leaving the waveform 120 which has a constant, level amplitude defining a null waveform.

Referring now to FIG. 4, the interferometer 100 of FIG. 3 is illustrated with an input optical signal which is sinusoidally modulated at a second frequency to form an input signal having a waveform illustrated at 150. The input signal 150 produces a signal on arm 108 having a waveform such as that illustrated at 152. The input signal also produces a signal on arm 110 in the configuration illustrated at 154. At this second sinusoidal modulation frequency, the differential propagation delay 112 between the two signals 152 and 154 at the coupler 106 is exactly one period, meaning that the signals 152, 154 are in phase with each other. Accordingly, when the signals are additively combined in coupler 106, the output signal detected from coupler 106 comprises an output signal 156 which is substantially identical to the input signal 150.

As the sinusoidal modulation frequency on the input signal is changed, the output signal 156 will also change based upon the additive relationship of the signals propagating in arms 108 and 110 when they are combined in coupler 106. However, the waveform of the output signal from coupler 106 will only be at a constant or null such as at 120 of FIG. 3 when the differential propagation delay period $\tau$ is an odd number of half periods of the signals traveling in arms 108 and 110. Thus, as the sinusoidal modulation frequency of the input optical signal is increased, the constant or null waveforms of the output signal from coupler 106 are repeated periodically, each time the differential propagation period between the signals from arms 108 and 110 corresponds to an odd number of half periods of those signals. It is through measuring at frequencies where a very large number of half periods fit into the delay $\tau$ that accuracies on the order of 10 parts per million are possible in the determination of $\tau$.

The nulls of the output from coupler 106 are indicative of the differential propagation delay. Accordingly, as the sinusoidal modulation frequency is increased, a value providing an indication of the differential propagation delay can be obtained by determining the difference in sinusoidal modulation frequencies which produce adjacent null values. This difference value provides a rough approximation of $1/\tau$.

A more accurate determination can be achieved by identifying a reference null value, and then counting the number of null values to a selected null value which is somewhat removed, such as 5 or 10 null values from the reference, and measuring the difference in frequency between the reference and the selected null value. That frequency difference, divided by the difference in null values between the selected null value and the reference null value provides a more accurate estimate of the characteristic frequency $1/\tau$. Of course, this value is representative of $\tau$, which is its inverse.

The accuracy of the above process may be further improved by feeding the output signal from coupler 106 into a network analyzer such as a spectrum analyzer which, when synchronized to the rate at which the modulation frequency of the source is scanned, displays notches in the frequency spectrum when a null or constant output signal waveform is detected. These notches can be used to very accurately identify the signal frequency producing the corresponding null and, therefore, the above-described technique for determining the frequency which relates to $1/\tau$ can be made more precisely. The accuracy of the result may be improved still further by making the measurements at notch values formed by high frequency modulation signals, since notches increase in depth as the associated modulation frequency increases. The increased depth permits a more accurate identification of the actual modulation frequency producing the null waveform.

Even more accuracy can be obtained by utilizing a frequency synthesizer in combination with the spectrum analyzer to produce a signal which is matched to the notch being displayed by the spectrum analyzer, and then reading the corresponding matching frequency as produced by the frequency synthesizer. These measuring procedures and the associated equipment for accomplishing this technique are described more fully hereafter.

The technique of the present invention, and the physical relationships providing the basis for, and associated with, operation of the technique may now be described somewhat more rigorously. In particular, reference is again made to the interferometer configuration illustrated in FIGS. 3 and 4. When an RF intensity modulation is utilized to drive an optical source having a coherence length which is much shorter than the differential propagation delay $\tau = \tau_1 - \tau_2$, the transfer function T(f) is the sum of the two intensity phasors from the two arms 108 and 110 of the circuit. T(f) may be expressed as:

$$T(f) = A_1 \exp[(2\pi j f \tau_1)] + A_2 \exp[(2\pi j f \tau_2)] \quad (1)$$
$$= M(f)\exp[(j\theta(f))]$$

Wherein:

coefficients $A_1$ and $A_2$, both non-negative numbers, depend on the coupling ratios of the two couplers 104 and 106, as well as on the losses in the two arms 108 and 110;

f is the RF frequency;

$\tau_1$ and $\tau_2$ are the delays in arms 108 and 110, respectively;

M(f) is a measure of the amount of modulation at RF frequency f at the output of coupler 106; and $\theta(f)$ is the frequency dependent phase of T(f).

Since the voltage output of photodetector is proportional to the incident optical intensity, a logarithmically calibrated network analyzer, or spectrum analyzer will display a quantity which is proportional to:

$$M_{log}(f) = 20\log[M(f)] \quad (2)$$
$$= 10\log[A_1^2 + A_2^2 + 2A_1A_2\cos(2\pi f \tau)]$$

In the above relationship, minima, or notches, corresponding to constant or null waveforms such as that illustrated at 120 of FIG. 3, occur at:

$$f_{notch} = \frac{1}{(2\tau)} + \frac{i}{\tau} \quad (3)$$

i is an integer defining the notch order. The order of a particular notch is determined by counting the notches which occur as the sinusoidal modulation frequency is increased from a value of 0, with the initial value of i beginning at 0 for the first notch detected.

The depth of these notches, as measured by the ratio of peak/minimum, is:

$$D = 10\log\left[\frac{(A_1 + A_2)}{(A_1 - A_2)}\right]^2 \quad (4)$$

According to Equation (4), a depth of 50 dB, which is a practically obtainable value, requires a matching of $A_1$ and $A_2$ to within $|A_1 - A_2|/|A_1 + A_2| \leq 0.003$. This tight tolerance can be achieved either by adjusting the coupling relationship in the couplers 104 and 106, if they are tunable, or by trimming the transmission of either arm 108 or arm 110, depending on which arm is carrying more light, using bending or similar techniques.

In many conventional applications, such as in the interferometric sensor arrangement illustrated in FIG. 1, one is interested in finding the exact value of the differential delay $\tau$ of each of the interferometers, so that the delay periods in the interferometers may be matched. This differential delay $\tau$ is directly related to the notch frequency, as indicated in Equation (3).

Experimentally, $f_{notch}$ can be determined only to within a certain tolerance defined as $\Delta f$. A deeper notch results in a smaller $\Delta f$. Therefore, it would appear that the deeper the notch, the more accurate the measurement would be. However, since the experimentally measured M(f) is noisy in the vicinity of a deep notch, it is necessary to choose for the tolerance $\Delta f$ a value such that $M(f_{notch} \pm \Delta f)/M(f_{notch}) \geq$ a certain threshold. For purposes of example, a threshold of 3 dB is used herein. Accordingly, from Equation (2), the following is derived:

$$\frac{\Delta f_{3dB}}{f} \simeq \frac{\Delta \tau}{\tau} \simeq \frac{|A_1 - A_2|}{2\pi \sqrt{A_1 A_2}} \times \frac{1}{(0.5 + i)} \quad (5)$$

It is noted that the periodicity of M(f) dictates notches with a fixed width, independent of the notch order. Therefore, the 3 dB normalized width of each notch decreases with the notch order i. Accordingly, by going to very high frequencies, a value for the relationship of $\Delta \tau / \tau$ in the ppm range is readily achieved.

The differential length L between the actual length of the optical fiber arms 108 and 110 is defined by $L = v_{group} \cdot v_{group}$ and $\tau$ may vary with the source wavelength and the temperature. As a result, the resolution of the differences to a desired tolerance is achieved only on a comparative basis such as between two similar unbalanced interferometers or recirculating loops, as illustrated in FIGS. 1 and 2. The method for accomplishing such matching between these loops is described hereafter.

Figure 5:
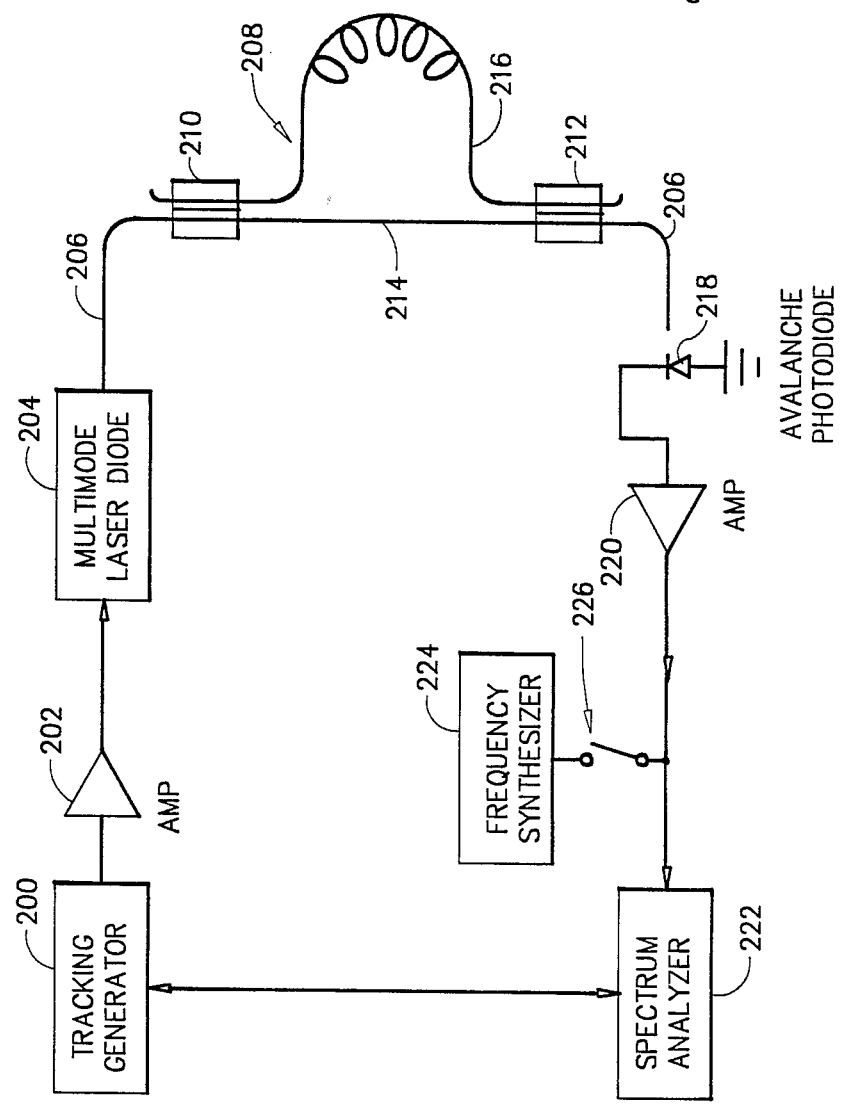
FIG. 5 is a schematic drawing of one preferred embodiment of a system for detecting differential propagation delays in accordance with the method of the present invention.

Referring now to FIG. 5, one preferred embodiment of a system for accomplishing the technique disclosed herein may be described. Specifically, a tracking generator 200 comprising an oscillator is utilized to provide a sinusoidal intensity modulation signal which is communicated via an amplifier 202 to a multimode laser diode 204. Laser diode 204 comprises a conventional, commercially available laser diode having a short coherence length. For example, the laser diode 204 may comprise a Model GO-ANA laser diode, commercially available from General Optronics.

Laser diode 204 is optically coupled to an optical fiber 206 for communicating optical signals to an interferometer generally indicated at 208. Interferometer 208 comprises an input fiber-optic directional coupler 210 positioned at a first location on optical fiber 206, and an output fiber-optic directional coupler 212 positioned at a second location on the optical fiber 206. An interferometer arm 214 is defined on that portion of fiber 206 extending between couplers 210 and 212. Another interferometer arm 216 providing an optical signal delay path comprises an optical fiber which is secured at either end to couplers 210 and 212 so as to be in coupling relationship through those couplers to the optical fiber 206.

The output from interferometer 208 is communicated from coupler 212 on optical fiber 206 to an optical connection with an avalanche photodiode 218 which comprises a detector for receiving and communicating electrical signals representative of optical signals received from fiber 206. The avalanche photodiode 218 is connected through an amplifier 220 to a spectrum analyzer 222. The spectrum analyzer 222 is also connected to the tracking generator 200 to form a network analyzer. A frequency synthesizer 224 is connectable via a switch generally indicated at 226 to the input of the spectrum analyzer 222.

In operation, an intensity modulation signal is generated in the tracking generator 200 and communicated via amplifier 202 to the multimode laser diode 204. Subject to the influence of the signal from tracking generator 200, the laser diode 204 produces an optical signal which is sinusoidally intensity modulated to create a waveform such as those described with reference to FIGS. 3 and 4. This intensity modulated optical signal is communicated via line 206 to the interferometer 208 where a portion of the optical input signal is propagated through arm 216, and the remainder of the signal is propagated through arm 214.

The signals from the interferometer 208 are combined in coupler 212 and the combined signal is coupled into optical fiber 206. The signal in fiber 206 is then communicated from fiber 206 to the photodiode 218, which produces an electrical signal representative of the optical signal communicated from fiber 206. The signal from photodiode 218 is communicated via amplifier 220 to the spectrum analyzer 222, which functions in response to the tracking generator 200 to define a network analyzer which displays an output signal representative of the signal communicated from interferometer 208 on fiber 206. Specifically, the spectrum analyzer displays waveforms including notches identifying those frequencies of the sinusoidal intensity modulation signal which produce a constant or null output signal from coupler 212 on to fiber 206.

After centering a desired notch on the spectrum analyzer screen, the switch 226 is closed to connect the frequency synthesizer 224 into the system. The synthesizer signal is combined with the detector signal so that both signals appear on the display of the spectrum analyzer 222. By adjusting the frequency of the signal from the frequency synthesizer 224, the frequency of the corresponding notch in the signal displayed by the spectrum analyzer can be matched very precisely. With the displayed signals so matched, the frequency of the signal from the synthesizer corresponds to the frequency of the sinusoidal intensity modulation signal which produced the constant or null corresponding to the notch signal displayed by spectrum analyzer 222.

For purposes of example, the implementation of the technique of the present invention on the system of FIG. 5 is described. Specifically, a multimode laser diode having a short coherence length of approximately 2 cm was used. The Mach-Zehnder interferometer 208 was constructed using single-mode fiber at 820 nm and tunable, fiber-optic couplers. The differential length between the arms 214 and 216 of the interferometer 208 was about 48.2 meters.

Figure 6A:
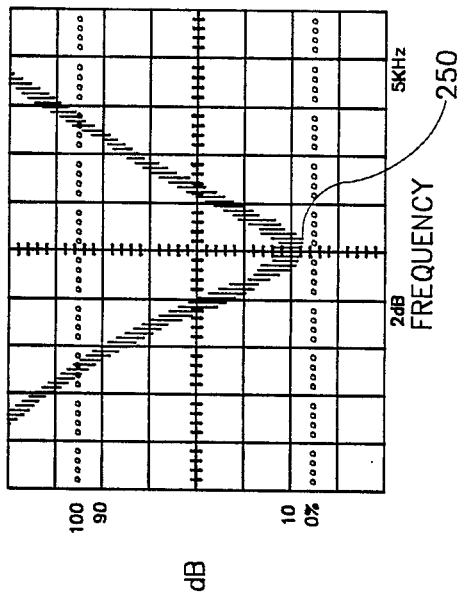
FIG. 6a is a graphical illustration of a notch waveform presented on a spectrum analyzer and corresponding to a null in the reference signal produced at a first modulation frequency.
Figure 6B:
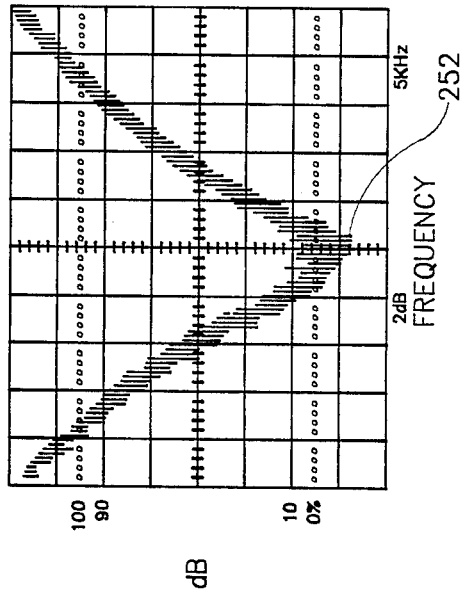
FIG. 6b is another graphical illustration of a notch waveform presented on a spectrum analyzer and corresonding to a null in the reference signal at a second modulation frequency.

FIGS. 6a and 6b graphically illustrate signals displayed on the spectrum analyzer in response to sinusoidal intensity modulation of the optical input signal at selected frequencies. Specifically, FIG. 6a illustrates a notch corresponding to notch order 32 (i=32) which has a minimum 250 at a frequency of 137.899 MHz. The notch illustrated in FIG. 6b was produced by the same system configuration, but comprises the notch order 232 (i=232). This notch is found to have a minimum 252 at a frequency of 986.502 MHz. It is noted that even though there is a substantial difference in the frequency of these notches, they remain similar in shape.

Using the apparatus described above, the value for the order i of the notches was obtained by counting the notches from frequency f=0 to the notch of interest. With the frequency information obtained from the notches illustrated in the spectrum analyzer, as described with reference to FIG. 6, and based on the order of those notches obtained by the counting method above, the differential propagation delay period $\tau$ was calculated using Equation (3).

Alternatively, two adjacent notch frequencies were measured, with that difference providing a rough approximation of $1/\tau$ as was described previously.

Based upon the known frequencies of the adjacent notches, and the approximation of $1/\tau$, Equation (3) was utilized to obtain a value for the order i of the notch. Since it is known that i must be an integer, any error in the value of i can be eliminated. The two methods described above for obtaining the value of $\tau$ were compared, and were found to give the same results.

The above described system and technique can be used in accomplishing matching of differential propagation delay periods between components such as the interferometers of the system of FIG. 1 or the recirculating loops in the configuration of FIG. 2. For example, once the value of the differential propagation delay $(\tau)$ is obtained, one may trim this delay to a desired value by using any technique for removing small lengths of optical fiber in the interferometric arms or delay lines, according to the relationship:

$$\frac{1}{\tau_{new}} - \frac{1}{\tau_{old}} = v_{group} \frac{(L_{old} - L_{new})}{L_{old} L_{new}} \quad (6)$$

where:

$L_{old}$ and $\tau_{old}$ are the differential fiber length and propagation delay before adjustment; and $L_{new}$ and $\tau_{new}$ are the corresponding differential length and delay after adjustment.

One technique for accomplishing this matching involves use of capillary tubes to hold the fibers for splicing. The capillary tubes and the fibers contained therein are ground down by polishing or other grinding techniques to a desired length. The fiber ends and capillary tubes are spliced after adjustment. Upon measurement, the fibers and tubes can be further ground and respliced to accomplish additional length adjustment. This or any other technique for removing small lengths of fiber can be utilized in accomplishing this matching process.

One embodiment of the technique of the present invention has been described herein. In the described embodiment, the differential delay is determined based on identification and measurement of null waveforms in the reference signal. However, this technique can be used in conjunction with the identification of any repeating waveform configuration in the reference signal. For example, one could base the determination of the differential delay on identification and measurement of peaks in the reference signal waveform, when the periodic modulation signals which are combined at the output are in phase with each other.

Although the technique and system for implementing the technique have been described particularly with reference to the Mach-Zehnder interferometer configurations of FIGS. 3 and 4, as they related to FIG. 1, it will be appreciated that the feed-backward or backward-flow recirculating system illustrated in FIG. 2 is also monitored and evaluated by the same technique. Like the interferometer of FIG. 1, the method and technique disclosed herein are applicable with the delay device illustrated in FIG. 2, since proper adjustment of the coupling coefficient and/or loop loss results in deep periodic notches as displayed on the spectrum analyzer.

In summary, not only does the invention described herein comprise a significant improvement over the prior art in accomplishing accurate determination of differential propagation delays in fiber-optic circuits, but it also overcomes other long-existent problems in the industry by (1) providing a technique and system for accomplishing determination of the differential propagation delays through use of the high order frequency filtering characteristics of the circuits themselves, thereby minimizing the requirement for external equipment; (2) providing a technique and system which is sufficiently accurate to meet the tolerances required for proper operation of interferometric fiber-optic sensing systems and fiber-optic signal processors, so that comparably less expensive and more readily obtainable optical sources having short coherence lengths may be utilized in such systems; (3) providing a technique and system capable of use with a very broad range of optical path length differences, which range is not limited by the optical source coherence length; and (4) providing a technique and system which can be easily and readily implemented on fiber-optic circuits for accomplishing repeated measurements of the differential propagation delay as fiber length adjustments are made, in order to bring the differential propagation delay to a desired value.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for determining differential signal propagation delays in circuits, comprising:
   transmitting a periodic signal into each of first and second signal paths;
   summing signals which are output from the two signal paths to produce a reference signal;
   adjusting the frequency of said periodic signal while monitoring said reference signal;
   determining a first particular frequency of the periodic signal transmitted into the two signal paths at which the reference signal comprises a first selected waveform configuration;
   determining a second particular frequency of the periodic signal transmitted into the two signal paths at which the reference signal comprises a second selected waveform configuration, said second particular frequency different from said first particular frequency; and
   determining the difference between the first particular frequency producing the first waveform configuration in the reference signal and the second particular frequency producing the second waveform configuration in the reference signal, thereby identifying a value representative of the difference in signal propagation time between the first and second signal paths.

2. A method for determining differential signal propagation delays as defined in claim 1 wherein the periodic signal comprises a sinusoidal waveform.

3. A method for determining differential signal propagation delays as defined in claim 2, wherein the first and second selected waveform configurations of the reference signal comprise substantially null waveforms.

4. A method for determining differential signal propagation delays in circuits, comprising:

transmitting a periodic signal comprising a sinusoidal waveform into each of two signal paths;

summing signals which are output from the two signal paths to produce a reference signal;

determining one particular frequency of the signals transmitted into the two signal paths at which the reference signal comprises a first selected substantially null waveform;

determining another particular frequency of the signals transmitted into the two signal paths at which the reference signal comprises another selected substantially null waveform; and determining the difference between the particular frequency producing the first substantially null waveform in the reference signals and the particular frequency producing said another substantially null waveform in the reference signal, thereby identifying a value representative of the difference in signal propagation time between the first and second signal paths, wherein other substantially null waveforms are produced in the reference signal at frequency values between those of the sinusoidal signal which produce said first and said another substantially null waveforms, with each said substantially null waveform being assigned an order value which increases sequentially with each increased frequency producing the corresponding null waveform, and wherein the step of determining the difference comprises dividing the difference between the frequencies which produce said first and said another substantially null waveforms by the difference in order number between said first and said another substantially null waveforms, thereby identifying a value representative of the difference in signal propagation time between the first and second signal paths.

5. A method for determining differential signal propagation delays as defined in claim 4, wherein the step of determining the difference comprises the steps of:

providing a signal corresponding to the reference signal into a network analyzer wherein notch waveforms are presented at reference signal frequencies corresponding to the null waveforms; and determining frequency difference between selected notch waveforms to obtain a value representative of difference in signal propagation time between the first and second paths.

6. A method for determining differential signal propagation delays as defined in claim 5, wherein the step of determining frequency difference between selected notch waveforms comprises:

selecting a first notch waveform having a first waveform order value;

selecting a second notch waveform having a second waveform order value; and dividing the difference in frequency between the first and second notch waveform by the difference between the first and second waveform order values to obtain a value representative of difference in signal propagation time between the first and second paths.

7. A method for determining differential signal propagation delays as defined in claim 6, further comprising the step of determining the inverse of said value representative of the signal propagation time to obtain the value of the signal propagation delay between the first and second paths.

8. A method for determining differential signal propagation delays in circuits, comprising:

transmitting a periodic signal comprising a sinusoidal waveform into each of two signal paths;

summing signals which are output from the two signal paths to produce a reference signal;

determining one particular frequency of the signals transmitted into the two signal paths at which the reference signal comprises a first selected substantially null waveform;

determining another particular frequency of the signals transmitted into the two signal paths at which the reference signal comprises another selected substantially null waveform; and determining the difference between the particular frequency producing the first substantially null waveform in the reference signal and the particular frequency producing said another substantially null waveform in the reference signal, thereby identifying a value representative of the difference in signal propagation time between the first and second signal paths, said step of determining the difference comprising the steps of:

providing a signal corresponding to the reference signal into a network analyzer wherein notch waveforms are presented at reference signal frequencies corresponding to the null waveforms; and determining frequency difference between selected notch waveforms to obtain a value representative of difference in signal propagation time between the first and second paths.

9. A method for determining differential signal propagation delays as defined in claim 8, wherein at least one of said selected notch waveforms is at a high modulation signal frequency.

10. A method for determining differential signal propagation delays as defined in claim 9, wherein said at least one notch waveform which is at a high modulation signal frequency is selected such that the measured amount of modulation $M(f)$ at the selected frequency is within a selected tolerance $\Delta f$ at a selected threshold value, according to the following relationship:

$$\frac{M(f_{notch} \pm \Delta f)}{M(f_{notch})} \geq \text{the selected threshold}$$

11. A method for determining differential signal propagation delays in optical signal paths, comprising the steps of:

transmitting a periodic signal into each of first and second signal paths;

adjusting the frequency of said periodic signal;

combining signals which are output from the two signal paths to produce a combined output signal, said combined output signal having a plurality of waveforms that vary in accordance with the frequency of said periodic signal, said plurality of waveforms including a plurality of substantially null waveforms at a corresponding plurality of frequencies of said periodic signal; and using the frequencies of said periodic signal corresponding to at least two of the substantially null waveforms to determine a differential delay between signals in the two signal paths.

12. A method for determining differential signal propagation delays as defined in claim 11, wherein the step of using at least two of the substantially null waveforms comprises:

determining a first frequency of the periodic signal corresponding to a first selected substantially null waveform;

determining a second frequency of the periodic signal corresponding to a second selected substantially null waveform, said second frequency different from said first frequency; and determining the difference between the frequencies corresponding to the first and second substantially null waveforms, thereby identifying a value representative of the difference in signal propagation times between the first and second signal paths.

13. A method for determining differential signal propagation delays as defined in claim 12, wherein at least one of the frequencies corresponding to the first and second substantially null waveforms is a high frequency value.

14. A method for determining differential signal propagation delays as defined in claim 12, wherein other substantially null waveforms are produced at periodic signal frequency values between those of the periodic signal which produce said first and said second substantially null waveforms, with each said substantially null waveform being assigned an order value which increases sequentially with each increased frequency producing the corresponding null waveform, and wherein the step of determining the difference comprises dividing the difference between the frequencies which produce said first and said second substantially null waveforms by the difference in order number between said first and said second substantially null waveforms, thereby identifying a value representative of the difference in signal propagation time between the first and second signal paths.

15. A method for determining differential signal propagation delays as defined in claim 14, wherein the step of determining the difference comprises the steps of:

providing signals corresponding to the combined signals into a network analyzer wherein notch waveforms are presented at signal frequencies corresponding to the substantially null waveforms; and determining frequency difference between selected notch waveforms to obtain a value representative of difference in signal propagation time between the first and second signal paths.

16. A method for determining differential signal propagation delays as defined in claim 15, wherein the step of determining frequency difference between selected notch waveforms comprises:

selecting a first notch waveform having a first waveform order value;

selecting a second notch waveform having a second waveform order value; and dividing the difference in frequency between the first and second notch waveform by the difference between the first and second waveform order values to obtain a value representative of difference in signal propagation time between the first and second signal paths.

17. A method for determining differential signal propagation delays as defined in claim 16, further comprising the step of determining the inverse of said value representative of the signal propagation time to obtain the value of the signal propagation delay between the first and second signal paths.

18. A method for determining differential signal propagation delays as defined in claim 15, wherein at least one of said selected notch waveforms is at a high modulation signal frequency.

19. A method for determining differential signal propagation delays as defined in claim 18, wherein said at least one notch waveform which is at a high modulation signal frequency is selected such that the measured amount of modulation M(f) at the selected frequency is within a selected tolerance $\Delta f$ at a selected threshold value, according to the following relationship:

$$\frac{M(f_{notch} \pm \Delta f)}{M(f_{notch})} \geq \text{the selected threshold}$$

20. A method for determining differential signal propagation delays as defined in claim 11, wherein the periodic signal comprises sinusoidal waveform.

21. A method for determining differential signal propagation delays as defined in claim 11, wherein the step of transmitting a periodic signal comprises the step of transmitting a sinusoidal optical signal into an optical input port of an unbalanced interferometer which defines said first and second signal paths.

22. A system for determining differential signal propagation delay between first and second optical paths, comprising:

a source of optical signals;

means for sinusoidally amplitude modulating optical signals from said source of optical signals at a plurality of modulation frequencies;

means defining a first optical path for propagating at least a portion of an amplitude modulated optical signal from the source therethrough;

means defining a second optical path for propagating at least a portion of said amplitude modulated optical signal therethrough;

means for combining optical signals which have propagated through the first and second optical paths to form a reference signal;

means for detecting null waveforms in said reference signal corresponding to at least two of said plurality of modulation frequencies; and means for identifying the modulation frequencies of amplitude modulated optical signals corresponding to at least two particular null reference signal waveforms.

23. A system for determining differential signal propagation delay between first and second optical paths, comprising:

a source of optical signals comprising a laser diode for providing optic signals having a short coherence length;

means for sinusoidally amplitude modulating optical signals from said source of optical signals;

means defining a first optical path for propagating at least a portion of an amplitude modulated optical signal from the source therethrough;

means defining a second optical path for propagating at least a portion of said amplitude modulated optical signal therethrough;

means for combining optical signals which have propagated through the first and second optical paths to form a reference signal;

means for detecting null waveforms in said reference signal; and means for identifying the frequency of an amplitude modulated optical signal corresponding to a particular null reference signal waveform.

24. A system for determining differential signal propagation delay as defined in claim 22, wherein the means for combining optical signals comprises an optical coupler.

25. A system for determining differential signal propagation delay as defined in claim 22, wherein the means for detecting comprises a network analyzer.

26. A system for determining differential signal propagation delay between first and second optical paths, comprising:

a source of optical signals;

means for sinusoidally amplitude modulating optical signals from said source of optical signals;

means defining a first optical path for propagating at least a portion of an amplitude modulated optical signal from the source therethrough, said means defining a first optical path comprising a first optical fiber which is optically coupled to receive optical signals transmitted from the source of optical signals;

means defining a second optical path for propagating at least a portion of said amplitude modulated optical signal therethrough;

means for combining optical signals which have propagated through the first and second optical paths to form a reference signal;

means for detecting null waveforms in said reference signal; and means for identifying the frequency of an amplitude modulated optical signal corresponding to a particular null reference signal waveform.

27. A system for determining differential signal propagation delay as defined in claim 26, wherein the first optical fiber comprises a first arm in an optical interferometer and wherein the means for defining a second optical path comprises a second optical fiber which is optically coupled to the first optical fiber in a configuration forming a second arm of the optical interferometer.

28. A system for determining differential signal propagation delay between first and second optical paths, comprising:

a source of optical signals;

means for sinusoidally amplitude modulating optical signals from said source of optical signals;

means defining a first optical path for propagating at least a portion of an amplitude modulated optical signal from the source therethrough;

means defining a second optical path for propagating at least a portion of said amplitude modulated optical signal therethrough;

means for combining optical signals which have propagated through the first and second optical paths to form a reference signal;

means for detecting null waveforms in said reference signal, said means for detecting comprising a network analyzer; and means for identifying the frequency of an amplitude modulated optical signal corresponding to a particular null reference signal waveform, said means for identifying the frequency comprising a frequency synthesizer for providing a frequency signal which is matched on the network analyzer with the reference signal to provide a measure of the frequency of the menas for sinusoidally amplitude modulating.

29. A system for determining differential signal propagation delay between first and second optical paths, comprising:

a source of optical signals;

means for sinusoidally amplitude modulating optical signals from said source of optical signals;

means defining a first optical path for propagating at least a portion of an amplitude modulated optical signal from the source therethrough;

means defining a second optical path for propagating at least a portion of said amplitude modulated optical signal therethrough;

means for combining optical signals which have propagated through the first and second optical paths to form a reference signal;

means for detecting null waveforms in said reference signal, said means for detecting comprising a spectrum analyzer; and means for identifying the frequency of an amplitude modulated optical signal corresponding to a particular null reference signal waveform.

30. A sytem for determining differential signal propagation delay between first and second optical paths, comprising:

means for transmitting a periodic signal having an adjustable frequency into each of two signal paths;

means for combining signals which are output from the two signal paths to produce a plurality of substantially null waveforms, each of said plurality of substantially null waveforms corresponding to a respective frequency of said periodic signal; and means for using said respective frequencies corresponding to at least two of the substantially null waveforms to determine the differential delay between signals in the two signal paths.

31. A system for determining differential signal propagation delay between first and second optical paths, comprising:

means for transmitting a periodic signal into each of two signal paths;

means for combining signals which are output from the two signal paths to produce a plurality of substantially null waveforms; and means for using at least two of the substantially null waveforms to determine differential delay between signals in the two signals paths, said means for using at least two of the substantially null waveforms comprising:

means for determining frequency of the periodic signal corresponding to a first selected substantially null waveform;

means for determining frequency of the periodic signal corresponding to a second selected substantially null waveform; and means for determining the difference between the frequencies corresponding to the first and second substantially null waveforms, thereby identifying a value representative of the difference in signal propagation times between the first and second signal paths.

* * * * *